July 19, 1960 E. D. COOPER ET AL 2,946,051
ANGLE SENSING INDICATOR FOR NUTATING BEAM RADAR SYSTEM
Filed March 23, 1955 2 Sheets-Sheet 1

INVENTORS
ELMER D. COOPER
CURTIS M. JANSKY
BY
R. V. Craddock
ATTORNEY

July 19, 1960 E. D. COOPER ET AL 2,946,051
ANGLE SENSING INDICATOR FOR NUTATING BEAM RADAR SYSTEM
Filed March 23, 1955 2 Sheets-Sheet 2

INVENTORS
ELMER D. COOPER
CURTIS M. JANSKY
BY
R. U. Craddock
ATTORNEY

United States Patent Office 2,946,051
Patented July 19, 1960

2,946,051
ANGLE SENSING INDICATOR FOR NUTATING BEAM RADAR SYSTEM

Elmer D. Cooper, Huntington Station, and Curtis M. Jansky, New York, N.Y., assignors to Sperry Rand Corporation, a corporation of Delaware Filed Mar. 23, 1955, Ser. No. 496,253

4 Claims. (Cl. 343—16)

This invention relates to nutating beam radar systems, and more particularly, is concerned with a radar indicator for showing the relative position between the center of a nutating radio beam and a target.

Tracking radars have heretofore been proposed which utilize a nutating antenna to provide angle sensing for automatically maintaining the center of the radar beam on the target. In order to effect automatic tracking it is necessary first to point the antenna in the general direction of a target so as to bring the target within the beam. Since the beam in automatic tracking radar is quite narrow, an automatic scanning phase is generally employed. In this phase the radar is used as a search device and is rapidly scanned circularly in azimuth and slowly changed in elevation. A P.P.I. type of indicator is used to indicate the azimuth and range of targets. When a target appears on the P.P.I. scope, the operator switches from automatic scanning to manual control wherein he positions the antenna to bring the target within the radar beam. The target must then be manually tracked to keep the target within the beam until the automatic ranging servo is locked on to the target. Then he switches over to the automatic tracking phase of operation in which the radar automatically tracks the movements of the target.

In a conventional P.P.I. type of presentation, both stationary and moving targets appear as intensified spots located at the corresponding ranges and azimuths of the targets with respect to the radar equipment. In the case of fast maneuvering targets, it is extremely difficult for the radar operator to maintain the target within the radar beam for a sufficient length of time to permit the ranging servo to slew out and lock on the target, with the aid of only the information available on the P.P.I. indicator. Conventional acquisition practice has been to sweep the nutation axis of the radar beam back and forth across an area in which the moving target is anticipated, based on information gained during the search phase, until the target spot is produced on the P.P.I. indicator, and then manually tracking the target by keeping the target spot on the indicator. However, no continuous information is provided in the standard P.P.I. indication which informs the radar operator as to the direction (up, down, right, or left) in which the radar antenna is to be turned in order to maintain the target spot on the indicator. As a result the operator frequently loses contact with the target before the ranging servo can lock on to the target and he is able to switch over to the automatic tracking phase.

It is the general object of the present invention to avoid and overcome the foregoing and other difficulties in and objections to the prior art practices by the provision of an improved indicator to facilitate manual tracking of a moving target.

Another object of the invention is to provide an improved automatic tracking radar in which the target may be more easily tracked manually for a sufficient time to permit the automatic tracking circuits to take over control of the radar antenna motion.

Another object of this invention is the provision of angle or direction sensing information relating the centers of a radar beam to the target on a P.P.I. type of radar indicator.

Another object of the invention is to provide means for discriminating on a radar indicator between low flying aircraft and ground return.

These and other objects of the invention which will become apparent as the description proceeds are achieved by radar apparatus comprising a nutating directional antenna which can be moved in azimuth and elevation. Pulse transmitting and receiving means are coupled to the antenna. The nutating antenna produces a conical scan of beam. A cathode ray indicator having beam intensity electrodes is connected to the receiver. A P.P.I. type of indication is presented on the cathode ray indicator by means of a sawtooth generator synchronized with the pulse transmitting means to provide a time base for range indication, and a resolver actuated by the azimuthal movement of the antenna for rotating the range sweep on the cathode ray indicator in synchronism with the azimuth rotation of the antenna.

In addition, according to the teaching of the present invention, a reference generator is driven by the nutating motor of the antenna for generating a pair of alternating voltage signals in phase quadrature at the nutation frequency. The quadrature signals at the nutation frequency are then applied to phase shifting means driven in synchronism with the azimuth rotation of the antenna whereby the quadrature signal phases are jointly displaced relative to those of the reference generator signals in accordance with the azimuth displacement of the antenna. The phase shifted quadrature signals are added to the range sweep and applied to the deflection electrodes of the cathode indicator to provide a superimposed circular sweep of the cathode ray beam in synchronism with the nutating scan of the antenna.

For a better understanding of the invention reference should be had to the accompanying drawings, wherein.

Figure 1:
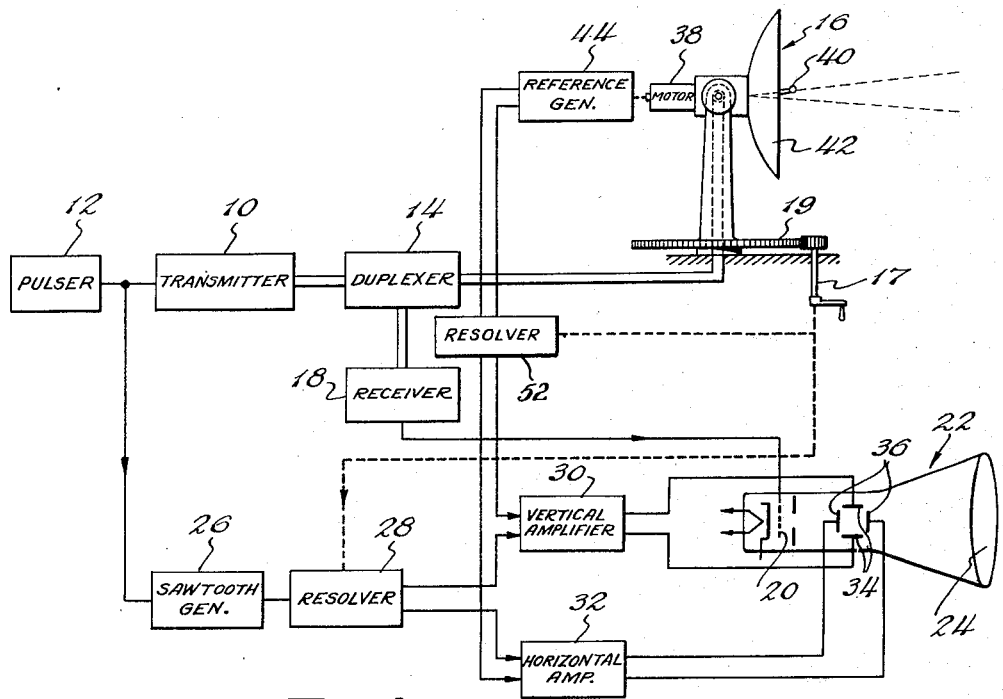
Fig. 1 is a schematic representation in block form of a first species of the present invention.

Referring specifically to Fig. 1, the numeral 10 indicates generally a transmitter, which preferably includes a high power microwave source such as a magnetron. The output of the transmitter 10 is pulsed by a pulse modulation source or pulser 12. The pulses of microwave power from transmitter 10 are coupled through a duplexer 14 to an antenna indicated generally at 16. The radiated pulses from the antenna 16, on striking a target in space, reflect energy in the form of echoes which are picked up by the antenna 16 and coupled through the duplexer 14 to a receiver 18. The antenna 16 is mounted for movement in azimuth and elevation, azimuth controls being applied manually as by means of a hand crank 17 connected through suitable gears 19 to the rotating base of the antenna. A similar manual control (not shown) in elevation is provided.

Pulses corresponding in time to the received echoes from the receiver 18 are coupled to the beam intensity control grid 20 of a cathode ray indicator tube 22. Thus the output of receiver 18 intensity modulates the cathode ray beam of the indicator tube 22 to produce a luminous spot on the screen 24 of the indicator tube 22 in response to received echo pulses from targets in space.

Sweep means for the indicator 22 for positioning the cathode ray beam as a function of range and azimuth includes a sawtooth generator 26 triggered by the pulser 12 in synchronism with the transmitted pulses from the transmitter 10. The output of the sawtooth generator 26 is connected to the rotor winding of a resolver 28, the resolver producing in its stator winding two sawtooth output voltages whose peak amplitudes are respectively proportional to the sine and cosine of the angular displacement between the rotor and stator of the resolver 28.

The two sawtooth output voltages from the stator of the resolver 28 are amplified respectively by a vertical amplifier 30 and a horizontal amplifier 32 and applied to the vertical deflection plates 34 and horizontal deflection plates 36 of the cathode ray indicator tube 22. Thus, a radial linear sweep is produced on the face 24 of the tube 22, the angular position of which is determined by the relative amplitudes of the two output signals from the resolver 28, which in turn are determined by the angular position between the rotor and stator of the resolver 28. The rotor of the resolver 28 is mechanically linked to the rotating base of the antenna 16, so that the angular position of the radial sweep on the indicator tube 22 corresponds to the azimuth angle of the antenna 16. The circuit as thus far described is a conventional radar system with P.P.I. type indication.

According to the present invention the antenna is nutated by a motor 38 which drives the radiating element 40 of the antenna 16 through a conical pattern about the principal axis of the parabolic reflector 42, thus producing a conical scan of the beam. Connected to the motor 38 is a reference generator 44, which is a two-phase alternating current generator having two output signals that are in phase quadrature and have the same frequency as the nutating frequency of the antenna 16. The two output signals from the reference generator 44 are connected via two-phase resolver 52 respectively to the vertical amplifier 30 and horizontal amplifier 32, where they are added to the output of the resolver 28, amplified, and applied respectively to the vertical deflection plates 34 and horizontal deflection plates 36 of the cathode ray indicator tube 22. The rotor of resolver 52 is mechanically linked to rotate with antenna azimuth control 17. The effect of the signals from the reference generator 44 is to superimpose a circular sweep of the electron beam of the indicator tube 22 on the normal range and azimuth sweep of the beam produced by the sawtooth generator 26 and resolver 28.

Figure 2:
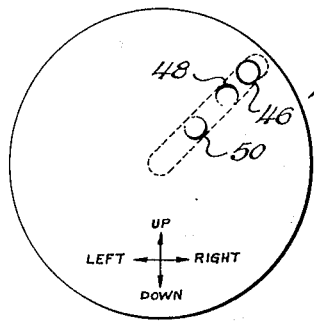
Fig. 2 is a pictorial representation of a cathode ray indicator display useful in explaining the operation of the apparatus of Fig. 1.

Neglecting for the moment the effect of resolver 52, the resulting display on the face 24 of the cathode ray indicator tube 22 is shown in Fig. 2. If a target in space is aligned with the principal axis of the parabolic reflector 42 of the antenna 16 the received energy will be equal for one complete revolution of the radiating element 40. As the cathode ray beam is scanned through a complete circle by the reference generator 44, a small circle of uniform intensity is produced on the face 24 of the indicator tube 22, as indicated at 46 in Fig. 2. If the target is slightly above the principal axis of the parabolic reflector 42, maximum intensity of the cathode ray beam is produced as the radar beam reaches the top of its conical scan as produced by nutation of the radiating element 40. The resulting indication is a circular arc having maximum intensity at the center of the arc corresponding to the top of the circular scan of the cathode ray beam as produced by the reference generator 44, as shown at 48 in Fig. 2. The center positions of the circle 46 and the arc 48 are determined by the ranges of the particular targets and the azimuth angle in which the antenna 16 is directed.

It will be appreciated from the above description that the orientation of the arc on the cathode ray indicator is an indication of the position of the target relative to the principal axis of the antenna 16. If the center of the arc points directly up, such as the arc 48 of Fig. 2, the operator knows that the antenna must be moved up in elevation to bring the target on the principal axis. He knows that when a circle is of uniform intensity, such as the circle 46 of Fig. 2, the target is directly on the principal axis of the antenna. If the arc is pointing down and to the right, such as the arc indicated at 50 in Fig. 2, he knows that the antenna must be moved down and to the right to bring the principal axis of the antenna directly on the target.

Figure 4:
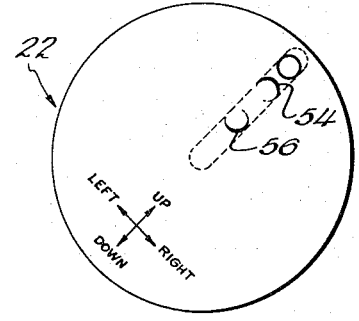
Fig. 4 is a pictorial representation of the radar display produced by the apparatus of Fig. 1.
Figure 3:
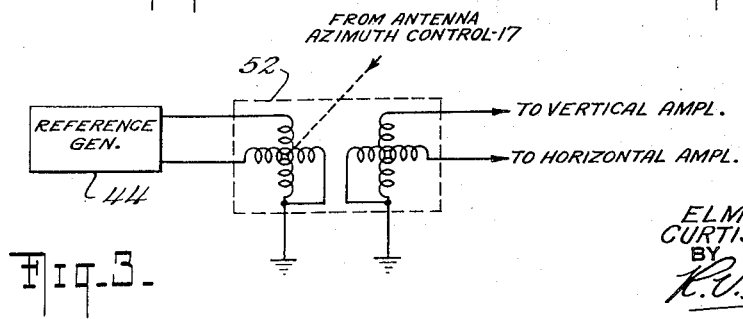
Fig. 3 is a schematic showing of resolver 52 of Fig. 1.

In the above described circuit of Fig. 1, wherein the effect of resolver 52 was ignored, the up-down left-right reference indicated by the arcs on the face 24 of the indicator tube 22 is determined by the fixed phase relationship between the output of the reference generator 44 and the rotational position of the radiating element 40. It is desirable, however, from the standpoint of the operator's efficiency to have the up-down left-right reference shift with azimuth, so that left and right will always correspond to the corresponding direction of change of azimuth as viewed on the screen. To shift the reference with azimuth in this manner, resolver 52 whose electrical details are shown in Fig. 3, is connected between the reference generator 44 and the vertical and horizontal amplifiers 30 and 32. The rotor of the resolver 52 is mechanically coupled to the azimuth control of the antenna 16 so that the relative phase relationship between the reference voltages from generator 44 and the rotational position of the radiating element 40 is shifted with change in azimuth of the antenna. In this manner the up-down left-right reference as viewed on the face 24 of the indicator tube 22 changes with azimuth, as shown in Fig. 4. Thus, a target directly above the principal axis of the antenna 16 would produce an arc with its mid-point directed along the radius, as indicated at 54, whereas a target below and to the right of the principal axis of the antenna 16 would produce an arc as indicated at 56. In the presentation of Fig. 4 the operator does not mentally have to shift his reference, which normally corresponds to the center of the P.P.I. indicator. He thus can mentally relate all required movements of the antenna as derived from the indicator with reference to his relative position at the center of the indicator.

It will be apparent that the diameter of the circular or arcuate trace on the cathode ray indicator produced by the nutating antenna is of uniform diameter at all ranges. However, the circular path of the radar beam center actually varies in diameter with range according to the conical volume traced out by the nutating beam. A different picture may be presented if the diameter of the circular traces is varied with distance from the center of the screen on the indicator tube 22 in linear fashion, in the same manner as the nutating beam.

Figure 5:
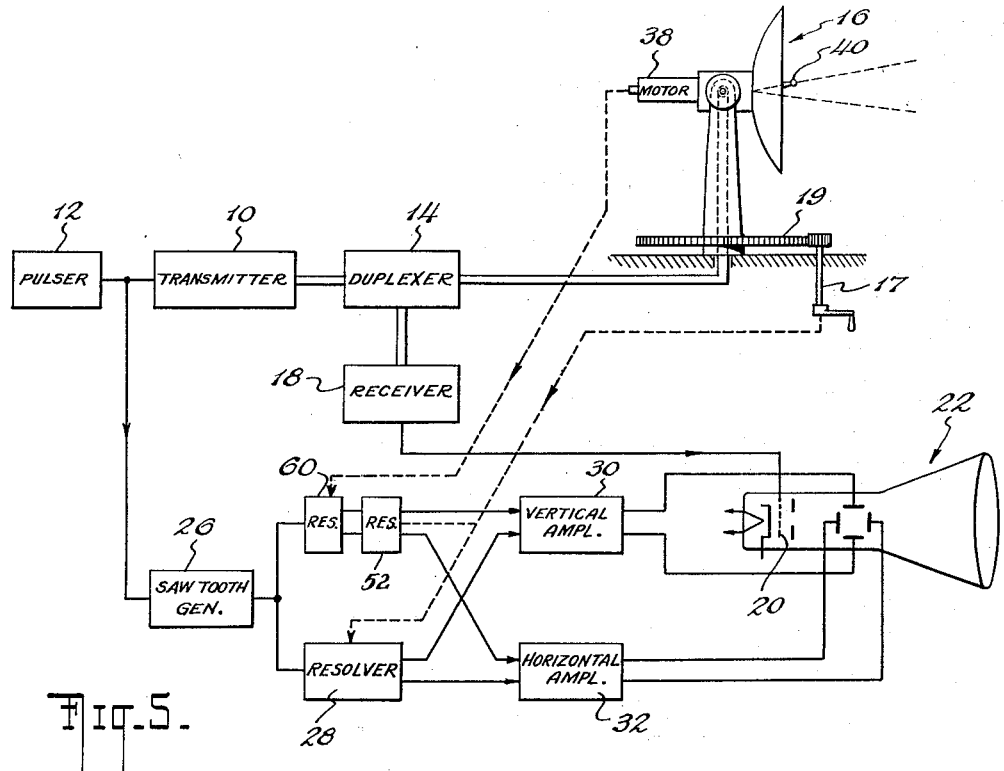
Fig. 5 is a schematic diagram in block form of a second species of the present invention.
Figure 6:
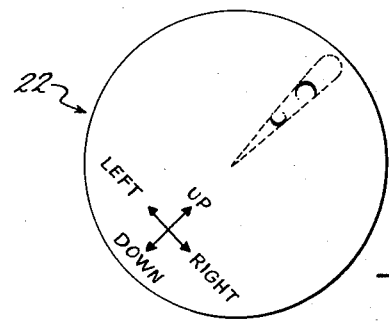
Fig. 6 is a pictorial representation of the radar display of the species of Fig. 5.
Figure 7:
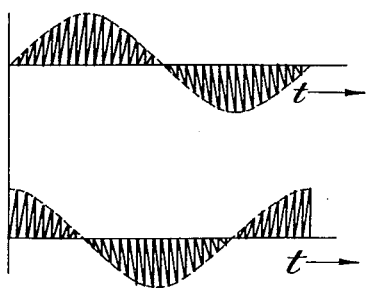
Fig. 7 is a graphical plot used in the explanation of the operation of the circuit of Fig. 5.

To provide such a presentation, a resolver 60 is substituted for the reference generator 44 of Fig. 1, as shown in Fig. 5. The input to the resolver is derived from the sawtooth generator 26, the resolver producing two output signals, whose amplitudes vary respectively as the sine and cosine of the angular displacement of the resolver, which are connected to the vertical amplifier 30 and horizontal amplifier 32 where they are combined with the output signals from the resolver 28. The output waveform of the resolver 60 is shown in Fig. 7. These output signals consist of a plurality of sawtooth waves at the frequency of the pulser 12, the amplitude of the sawtooth waves varying sinusoidally at the nutation frequency of the antenna 16. The resulting signals applied to the vertical and horizontal deflection plates are a pair of sawtooth waves whose average peak amplitudes are determined by the resolver 28 in accordance with the azimuth angle of the antenna 16 and which vary sinusoidally about this average value at the nutation frequency. The resulting sweep of the electron beam of the indicator 22 is in the form of a planar projection of an elliptical cone in the plane of the face 24 of the indicator tube 22. The resulting target trace on the scope is shown in Fig. 6. This presentation gives an indication of the azimuth angular displacement of the radar beam from the central axis of the antenna.

The up-down-left-right reference is rotated with azimuth, as in the species of Fig. 1, by the action of resolver 52 driven in coincidence with the azimuthal movement of the antenna 16 in the manner described in connection with Fig. 1. Resolver 52 is connected between the resolver 60 and the vertical and horizontal amplifiers 30 and 32 to shift the relative phase between the envelope of the modulated sawtooth waves produced by the resolver 60 and the rotational position of the radiating element 40.

Because of the correspondence between the radar indication and the path described by the radar beam, target arcs appearing on the indicator are shown in Fig. 6 in their true azimuthal relationship with respect to the sweep origin, whether or not the principal axis of the antenna bears directly on the target.

From the above description it will be seen that the various objects of the invention have been achieved by utilizing information derived from the nutating antenna to add angle sensing to the P.P.I. indicator. In addition to providing angle sensing information, the present invention also aids in the discrimination between low flying aircraft target indications and ground return. In the case of low flying aircraft the principal axis of the antenna 16 is manually set below the low flying aircraft and above the ground plane. In such case, the target indication shows an arc of the circle concave down while the ground return shows the arc of the circle concave up, so that the target can be readily identified from the ground return.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Radar apparatus comprising directional antenna means including a motor for nutating the antenna, means for moving the antenna about two perpendicular axes, a pulsed transmitter and receiver coupled to the antenna for radiating energy pulses and receiving echoes from targets in space, a cathode ray indicator including beam intensity controlling means and beam deflecting means, the beam intensity controlling means being coupled to the receiver output for modulating the beam intensity in response to received signals, first sweep generating means synchronized with the pulsed transmitter and coupled to the beam deflecting means of the cathode ray indicator, second sweep generating means actuated in response to movement of the antenna about one of said axes and coupled to the beam deflecting means of the cathode ray indicator, a reference generator driven by the nutating motor, the reference generator producing two alternating current signals of the same period as that of the nutating antenna and in phase quadrature to each other, a resolver connected in series with the two output signals of the reference generator, the two output signals being coupled via said resolver to the beam deflecting means to produce a circular sweep of the beam of said cathode ray indicator in synchronism with the nutating movement of the antenna, and means for actuating the resolver in response to movement of the antenna about said one of said axes, whereby the phase relationship between the circular sweep of the beam of said cathode ray indicator and the nutating movement of the antenna is shifted in response to changes in the orientation of the antenna about said one of said axes.

2. Radar apparatus comprising directional antenna means including a motor for nutating the antenna about a first axis, means for moving the antenna about a second axis perpendicular to said first axis, a pulse transmitter and receiver coupled to the antenna for radiating energy pulses and receiving echoes from targets in space, a cathode ray indicator including beam intensity controlling means and beam deflecting means, the beam intensity controlling means being coupled to the receiver output for modulating the beam intensity in response to received signals, sweep generating means synchronized with the pulse transmitter and coupled to the beam deflecting means of the cathode ray indicator, said sweep generating means being responsive to movement of the antenna about said second axis, a reference generator driven by the nutating motor, the reference generator producing two alternating current signals of the same period as that of the nutating antenna and in phase quadrature to each other, means for jointly phase shifting the two output signals of the reference generator, means for applying said jointly phase shifted signals to the beam deflecting means to produce a circular sweep of the beam of said cathode ray indicator in synchronism with the nutating movement of the antenna, and means for actuating the phase shifting means in response to movement of the antenna about said second axis, whereby the phase relationship between the circular sweep of the beam of said cathode ray indicator and the nutating movement of the antenna is shifted in response to changes in orientation of the antenna about said second axis.

3. Apparatus as defined in claim 2 further including means for jointly varying the amplitudes of the two output signals of said reference generator as a function of time during the interval between successive operations of said pulsed transmitter.

4. Radar apparatus comprising directional antenna means, means for nutating the antenna about a first axis, means for moving the antenna about a second axis perpendicular to said first axis, a pulsed transmitter and receiver coupled to the antenna for radiating energy pulses and receiving echoes from targets in space, a cathode ray indicator including beam intensity controlling beams and beam deflecting means, the beam intensity controlling means being coupled to the receiver output for modulating the beam intensity in response to received signals, sweep generating means synchronized with the pulsed transmitter and coupled to the beam deflecting means of the cathode ray indicator, said sweep generating means being responsive to movement of the anetnna about said second axis, and circular sweep generating means synchronized with the antenna nutating means, said circular sweep generating means comprising a sawtooth generator and a first resolver driven by the antenna nutating means, the output of the sawtooth generator being connected to the first resolver, the first resolver producing output signals whose respective peak amplitudes vary in phase quadrature, and a second resolver connected in series with the two output signals of said first resolver for applying said two output signals of said first resolver to the beam deflecting means of the cathode ray indicator for sweeping the beam in a circle at the nutation frequency of the antenna, and means for actuating the second resolver in response to movement of the antenna about said second axis.

References Cited in the file of this patent

UNITED STATES PATENTS

| | | |
|---|---|---|
| 2,468,032 | Busignies | Apr. 26, 1949 |
| 2,617,982 | Holschuh et al. | Nov. 11, 1952 |
| 2,743,439 | Crump | Apr. 24, 1956 |